(12) United States Patent
Shinohara et al.

(10) Patent No.: US 10,517,047 B2
(45) Date of Patent: Dec. 24, 2019

(54) WIRELESS COMMUNICATION SYSTEM AND WIRELESS COMMUNICATION METHOD

(71) Applicant: NIPPON TELEGRAPH AND TELEPHONE CORPORATION, Tokyo (JP)

(72) Inventors: Shoko Shinohara, Yokosuka (JP); Yasuhiko Inoue, Yokosuka (JP); Junichi Iwatani, Yokosuka (JP); Masato Mizoguchi, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/330,014

(22) PCT Filed: Aug. 30, 2017

(86) PCT No.: PCT/JP2017/031256
§ 371 (c)(1),
(2) Date: Mar. 1, 2019

(87) PCT Pub. No.: WO2018/043600
PCT Pub. Date: Mar. 8, 2018

(65) Prior Publication Data
US 2019/0191385 A1 Jun. 20, 2019

(30) Foreign Application Priority Data

Sep. 2, 2016 (JP) .................................. 2016-172079

(51) Int. Cl.
*H04W 52/24* (2009.01)
*H04W 84/12* (2009.01)
*H04W 52/26* (2009.01)

(52) U.S. Cl.
CPC ....... *H04W 52/241* (2013.01); *H04W 52/243* (2013.01); *H04W 84/12* (2013.01); *H04W 52/262* (2013.01)

(58) Field of Classification Search
CPC . H04W 72/082; H04W 52/243; H04W 24/10; H04W 52/143; H04W 88/08;
(Continued)

(56) References Cited

U.S. PATENT DOCUMENTS

2015/0289142 A1  10/2015 Abeysekera et al.
2016/0309476 A1* 10/2016 Madan ................. H04W 16/10

FOREIGN PATENT DOCUMENTS

JP      2013115503 A    6/2013
WO   WO-2014073706 A1  5/2014

OTHER PUBLICATIONS

International Preliminary Report on Patentability regarding PCT/JP2017/031256, dated Mar. 14, 2019.
(Continued)

*Primary Examiner* — Keith Ferguson
(74) *Attorney, Agent, or Firm* — Harness, Dickey & Pierce, P.L.C.

(57) ABSTRACT

A centralized management device includes an information collection unit that collects interference power level information including received power levels from neighboring access points causing interference to the access points, a received power level from each station being a destination of the access points, and transmission power level information including a transmission power level of the access points, and a control value decision unit that decides an interference detection threshold and a transmission power level in the access points according to an acquisition frequency of transmission opportunity and an estimated value of throughput that are computed, from the collected information, based
(Continued)

on an interference relationship and notifies the decided interference detection threshold and the transmission power level as control values to the access points; and the access points performs control of the interference detection threshold and the transmission power level based on the control values notified from the centralized management device.

11 Claims, 10 Drawing Sheets

(58) Field of Classification Search
CPC ... H04W 36/20; H04W 28/16; H04W 52/241; H04W 52/283; H04W 52/386; H04W 84/12; H04W 52/14; H04W 72/0433; H04W 92/045; H04W 52/262
See application file for complete search history.

(56) References Cited

OTHER PUBLICATIONS

IEEE P802.11axTM Draft 0.1, Mar. 2016.
Koji Yamamoto et al., "Analysis of Inversely Proportional Setting of Transmission Power and Carrier Sense Threshold in WLANs Throughput Enhancement of Single Transmitter", IEICE Technical Report, Jun. 2016, RCS2016-91 with English abstract.
International Search Report for PCT/JP2017/031256, ISA/JP, Tokyo, dated Nov. 7, 2017, with English translation attached.
Written Opinion of the ISA for PCT/JP2017/031256, ISA/JP, dated Nov. 7, 2017.

\* cited by examiner

WIRELESS COMMUNICATION SYSTEM AND WIRELESS COMMUNICATION METHOD

CROSS-REFERENCE TO RELATED APPLICATIONS

This application is a U.S. National Stage application claiming the benefit of prior filed International Application No. PCT/JP2017/031256, filed on Aug. 30, 2017, in which the International Application claims priority from Japanese Patent Application Number 2016-172079, filed on Sep. 2, 2016, the entire contents of which are incorporated herein by reference.

TECHNICAL FIELD

The present invention relates to a wireless communication system in which an access point and a plurality of stations perform wireless communication, and a wireless communication method. In the present specification, the access point and the station are collectively referred to as a wireless communication device, and whenever necessary, the access point is referred to an AP for short, and the station is referred to as an STA for short.

BACKGROUND ART

In recent years, wireless communication devices in compliance with wireless LAN standards that are stipulated in IEEE 802.11 have drastically come into use, and many wireless communication devices that use an unlicensed band of 2.4 GHz or 5 GHz have been deployed. In the unlicensed band, a state of a channel that is scheduled for transmission is determined with prior carrier sense, and the transmission is started if a state where the transmission is available is reached. For this reason, in an environment where many wireless communication devices are mixedly present in the unlicensed band, a plurality of neighboring wireless communication devices are in suspending transmission while a certain wireless communication device performs transmission, and thus throughput is decreased.

Incidentally, in IEEE 802.11ax, the introduction of a technology that controls the interference detection threshold which is used in order to determine the state of the channel with the carrier sense is expected with (Non-Patent Document 1). With the technology, control is performed in such a manner that the interference detection threshold becomes higher than in the related art. Thus, although an interference power level from a neighboring wireless communication cell is observed, there are many opportunities to determine that a channel is transmittable. It is noted that in the case of a wireless LAN, the interference detection threshold is equivalent to a carrier sense threshold.

Furthermore, in Non-Patent Document 1, a technology is disclosed that controls the interference detection threshold and, along with this, controls a transmission power level. Moreover, a procedure is also expected in which an upper limit is imposed on the interference detection threshold and the transmission power level and in which, along with this, control is performed in conjunction with each of the values.

With these controls, it is expected that, in an environment in which the number of transmission opportunities for wireless communication devices is reduced due to interference with each other, more transmission opportunities are acquired than before and thus the throughput is improved. Moreover, because the same procedure is applied even if an LTE signal is transmitted in the unlicensed band, it is thought that the control of the interference detection threshold and the transmission power level has a close relationship with communication quality of the unlicensed band.

Moreover, in Non-Patent Document 2, a technology is disclosed that suppresses the interference with each other on the same channel using pieces of information of interference signal that are collected from a plurality of wireless communication devices, and control is possible that improves frequency utilization efficiency of an entire wireless communication system, not utilization efficiency of an individual wireless communication device.

Non-Patent Document 1: IEEE P802.11 ax™ Draft 0.1, March 2016

Non-Patent Document 2: Koji Yamamoto and Hirantha Abeysekera, "Analysis of Inversely Proportional Setting of Transmission Power and Carrier Sense Threshold in WLANs", IEICE Technical Report, June 2016

DISCLOSURE

Problems to be Solved

Stipulation in IEEE 802.11ax assumes that an individual AP independently controls the interference detection threshold. However, in such a case, although an improvement in throughput for the AP itself is possible, to the contrary, there is a likelihood that throughput for a neighboring AP will be degraded. A first reason for this is because there is a likelihood that a wireless communication device which becomes a new exposed station or hidden station will occur by performing control to raise the interference detection threshold or lowering the transmission power level. A second reason for this is because there is a likelihood that the transmission opportunity from the wireless communication device present within a communication area will be increased and thus that a SINR of a wireless frame which is received by a destination terminal will be degraded.

In order to solve this problem, in Non-Patent Document 2, a technology is proposed that controls the interference detection threshold and the transmission power level in such a manner that a centralized control device is provided and thus that frequency utilization efficiency of each of all the wireless communication devices is not decreased. However, in Non-Patent Document 2, because an expected value of throughput is calculated with a statistical technique, using a Shannon capacity, if a destination for wireless communication is specifically considered, it is thought that there is room for an improvement. That is, if a distance between the transmission side and the reception side is short and an SINR is satisfactory, there is an opportunity to lower the transmission power level and raise the interference detection threshold. On the other hand, if the distance between the transmission side and the reception side is long and the SINR is poor, there is also a likelihood that maintenance of the transmission power level and the interference detection threshold will contribute to improvements in throughput for all APs. In this manner, more pieces of information on the vicinity of an AP that is a control target are utilized and thus a further improvement in throughput is expected.

A proposition of the present invention is to provide a wireless communication system and a wireless communication method that control a transmission power level and an interference detection threshold for each access point in order to improve throughput for a wireless communication system in a plurality of access points that cause interference with each other.

Means for Solving the Problems

According to a first invention, there is provided a wireless communication system including a plurality of access points interfering with each other; a plurality of stations being connected to the access points; and a centralized management device being connected to the access points, in which the centralized management device is configured to include an information collection unit that collects interference power level information including received power levels from neighboring access points being a source that causes interference to the access points, a received power level from each station being a destination of the access points, and transmission power level information including a transmission power level of the access points, and a control value decision unit that decides an interference detection threshold and a transmission power level in the access points according to an acquisition frequency of transmission opportunity and an estimated value of throughput that are computed, from the collected information, based on an interference relationship, and that notifies the decided interference detection threshold and the decided transmission power level as control values to the access points; and the access points are configured to perform control of the interference detection threshold and the transmission power level based on the control values notified from the centralized management device.

In the wireless communication system according to the first invention, the access points are configured to notify the interference detection threshold and the transmission power level notified from the centralized management device to the each station under the control, and the each station is configured to perform control based on the notified interference detection threshold and the notified transmission power level.

In the wireless communication system according to the first invention, the control value decision unit is configured to temporarily decide interference detection threshold and the transmission power level and to compute an estimated value of throughput after the control using a temporarily decided value, and if throughput improves, to set the temporarily decided value as the control value.

In the wireless communication system according to the first invention, the control value decision unit is configured to decide the interference detection threshold and the transmission power level in order from an access point having higher acquisition frequency of transmission opportunity.

In the wireless communication system according to the first invention, among control-target access points, the control value decision unit is configured to perform control that lowers the transmission power level on an access point having the acquisition frequency of transmission opportunity higher than a predetermined threshold, and to perform control that raises the interference detection threshold on an access point having the acquisition frequency of transmission opportunity lower than the predetermined threshold.

Moreover, the control value decision unit is configured to set a lower limit value of the transmission power level based on a SINR value that is at least necessary in a target modulation and demodulation scheme by using the received power level from the each station being the destination, which is collected by the information collection unit. Furthermore, when lowering the transmission power level of the access point, the control value decision unit is configured to set as a reference a received power level from an access point which is higher than the interference detection threshold, among the received power levels observed by the access point. Furthermore, when lowering the transmission power level of the access point, the control value decision unit is configured to set as a reference a received power level from an access point having an interference power level equal to or above a predetermined value, which is caused by a wireless signal transmitted from the access point or an SINR equal to or below a predetermined value. Furthermore, when raising the interference detection threshold of the access point, the control value decision unit is configured to set as a reference a received power level that is above and the closest to a current interference detection threshold, among the received power levels observed by the access point.

In the wireless communication system according to the first invention, when searching the interference detection threshold and the transmission power level using a Particle Swarm Optimization (PSO) method, the control value decision unit is configured to set a value lower than a reference value to a coefficient of an amount of change in the interference detection threshold and the transmission power level for an access point having the acquisition frequency of transmission opportunity higher than a predetermined threshold, and to set a value higher than a reference value to a coefficient of an amount of change in the interference detection threshold and the transmission power level for an access point having the acquisition frequency of transmission opportunity lower than the predetermined threshold.

According to a second invention, there is provided a wireless communication method of a system that includes a plurality of access points interfering with each other, a plurality of stations being connected to the access points, and a centralized management device being connected to the access points, in which the centralized management device controls a transmission power level and an interference detection threshold for the access points, in which the centralized management device collects interference power level information including received power levels form neighboring access points being a source that causes interference to the access points, a received power level from each station being a destination of the access points, and transmission power level information including a transmission power level of the access points, and decides an interference detection threshold and a transmission power level in the access points according to an acquisition frequency of transmission opportunity and an estimated value of throughput that are computed, from the collected information, based on an interference relationship, and notifies the decided interference detection threshold and the decided transmission power level as control values to the access points; and the access points perform control of the interference detection threshold and the transmission power level based on the control values notified from the centralized management device.

Effect

According to the invention, in an environment where a plurality of access points that obtain a transmission opportunity with carrier sense cause interference with each other and thus throughput is decreased, a centralized management device can control a transmission power level and an interference detection threshold for each access point while checking an acquisition frequency of transmission opportunity and throughput for each access point. Accordingly, an improvement in throughput for an entire wireless communication system can be achieved without each access point reducing the throughput.

DETAILED DESCRIPTION OF THE EMBODIMENTS

Figure 1:
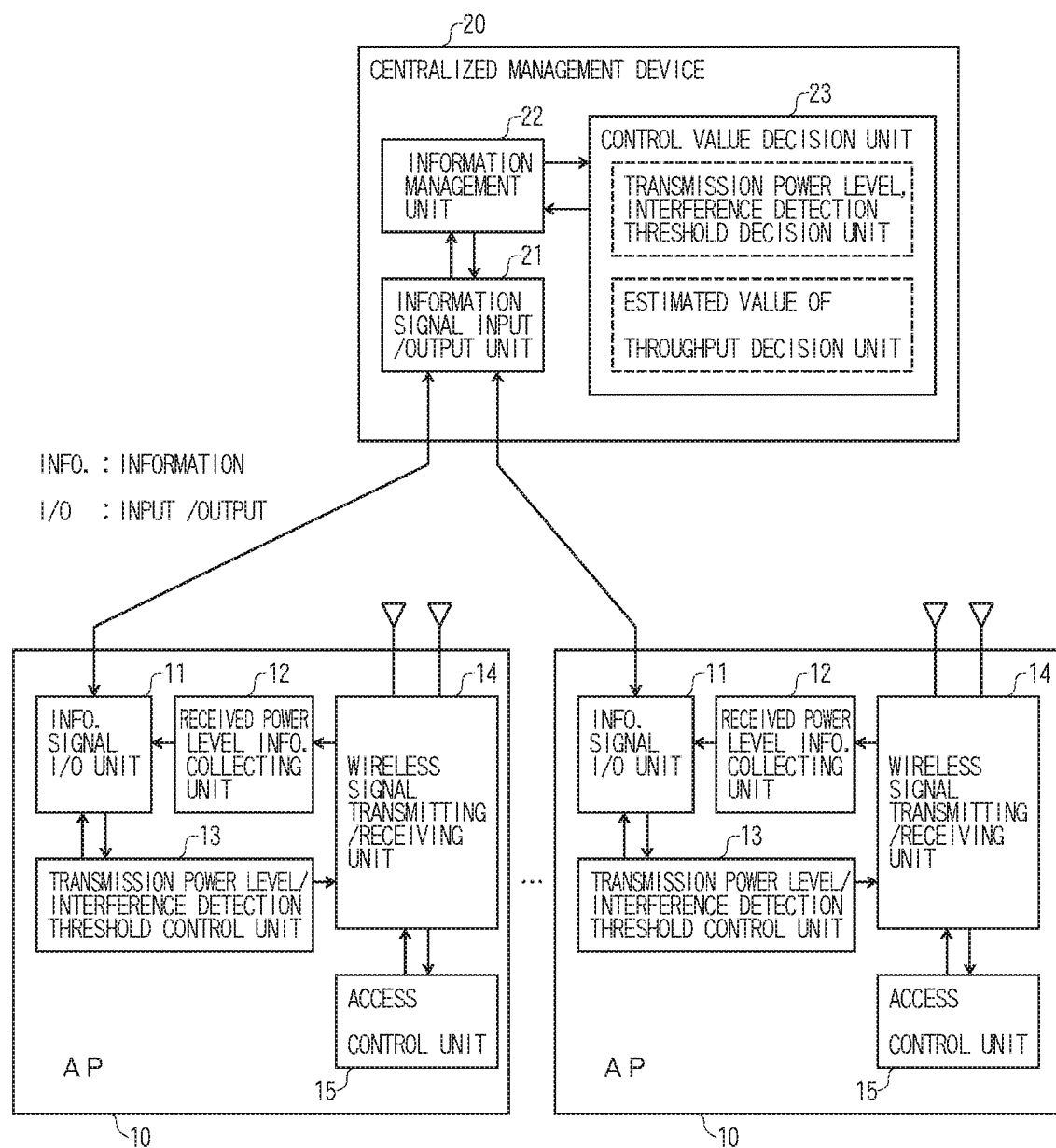
FIG. 1 is a diagram illustrating an example of a configuration of a wireless communication system according to the present invention.

FIG. 1 is an example of a configuration of a wireless communication system according to the present invention.

In FIG. 1, each access point (AP) 10 and a centralized management device 20 are configured to possibly exchange pieces of information with each other through their respective information signal input/output units 11 and 21. For example, the centralized management device 20 transmits a control signal for collecting information from the AP 10, or a control signal for changing an interference detection threshold or a transmission power level of the AP 10, to the AP 10. The AP 10 transmits received power levels that are collected from a wireless signal transmitting/receiving unit 14 and a received power level information collecting unit 12, to a centralized management device 20.

In the centralized management device 20, information that is input into an information signal input/output unit 21 is sent to an information management unit 22, and a received power level, a transmission power level, an interference detection threshold, a target MCS, and the like that are collected in the information management unit 22 are managed by every AP that is being connected. Moreover, a control value decision unit 23 that is connected to the information management unit 22 computes an estimated value of throughput, decides the transmission power level and the interference detection threshold of each AP 10, and transmits these from the information signal input/output unit 21 to each AP 10. The AP 10 sends the transmission power level and the interference detection threshold that are input into the information signal input/output unit 11, to a transmission power level/interference detection threshold control unit 13, and a transmission power level and an interference detection threshold of the wireless signal transmitting/receiving unit 14 are changed in the transmission power level/interference detection threshold control unit 13. For example, an access control unit 15 that performs access control using CSMA/CA is connected to the wireless signal transmitting/receiving unit 14.

Furthermore, the transmission power level and the interference detection threshold that are set for the AP 10 are transmitted from the wireless signal transmitting/receiving unit 14 to a station (STA) that is under the control thereof, which is not illustrated, and a transmission power level and an interference detection threshold of the STA are controlled.

It is noted that a configuration may be employed in which a function of the centralized management device 20 is incorporated in any one of the plurality of APs 10. In such a case, the AP concurrently performs a function that is required of the AP and a function that is required of the centralized management device.

Figure 2:
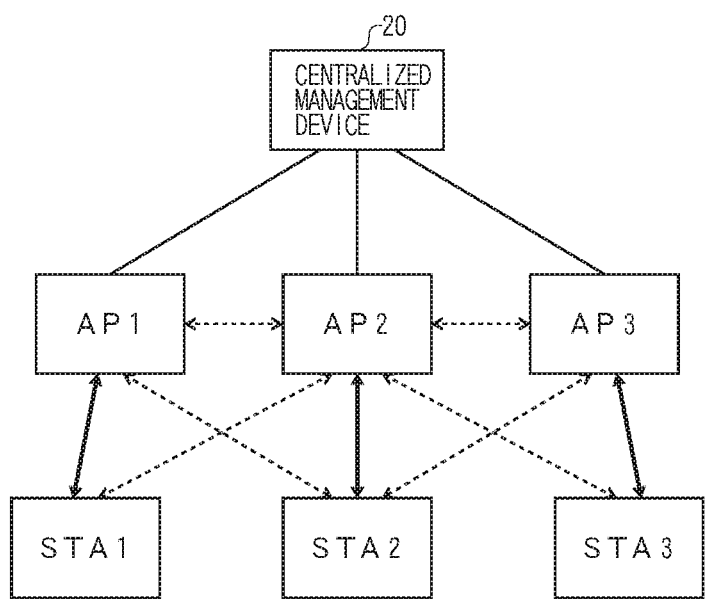
FIG. 2 is a diagram illustrating an example in which the wireless communication system according to the present invention is assumed.

FIG. 2 illustrates a wireless communication system according to the present invention.

In FIG. 2, a plurality of APs, an AP 1, an AP 2, and an AP 3 are connected to the centralized management device 20, and an STA 1, an STA 2, and an STA 3 that are destinations, respectively, of the AP 1, the AP 2, and the AP 3, are connected. A connection for information signal transfer between the centralized management device 20 and each of the AP 1 to AP 3 is indicated by a solid line. Furthermore, a connection between each of the AP 1 to AP 3 and each of the STA 1 to STA 3 that are destinations, respectively, of the AP 1 to AP 3 is indicated by a solid-line arrow. Moreover, an interference signal is between each of the APs or between an AP and an STA other than the destination of the AP, and a connection therebetween is indicated by a broken line.

In the initial state, a received power level between the AP 1 and the AP 2 is −60 dBm, a received power level between the AP 1 and the AP 3 is −80 dBm, and a received power level between the AP 2 and the AP 3 is −62 dBm. Furthermore, it is assumed that interference detection thresholds of all the APs are −76 dBm, and that the AP 1 and the AP 2, and the AP 2 and the AP 3 mutually detect a received power level that is at or above the interference detection threshold.

FIGS. 3 to 6 illustrate examples of a procedure for processing by the centralized management device that decides the transmission power level and the interference detection threshold of each AP.

Figure 3:
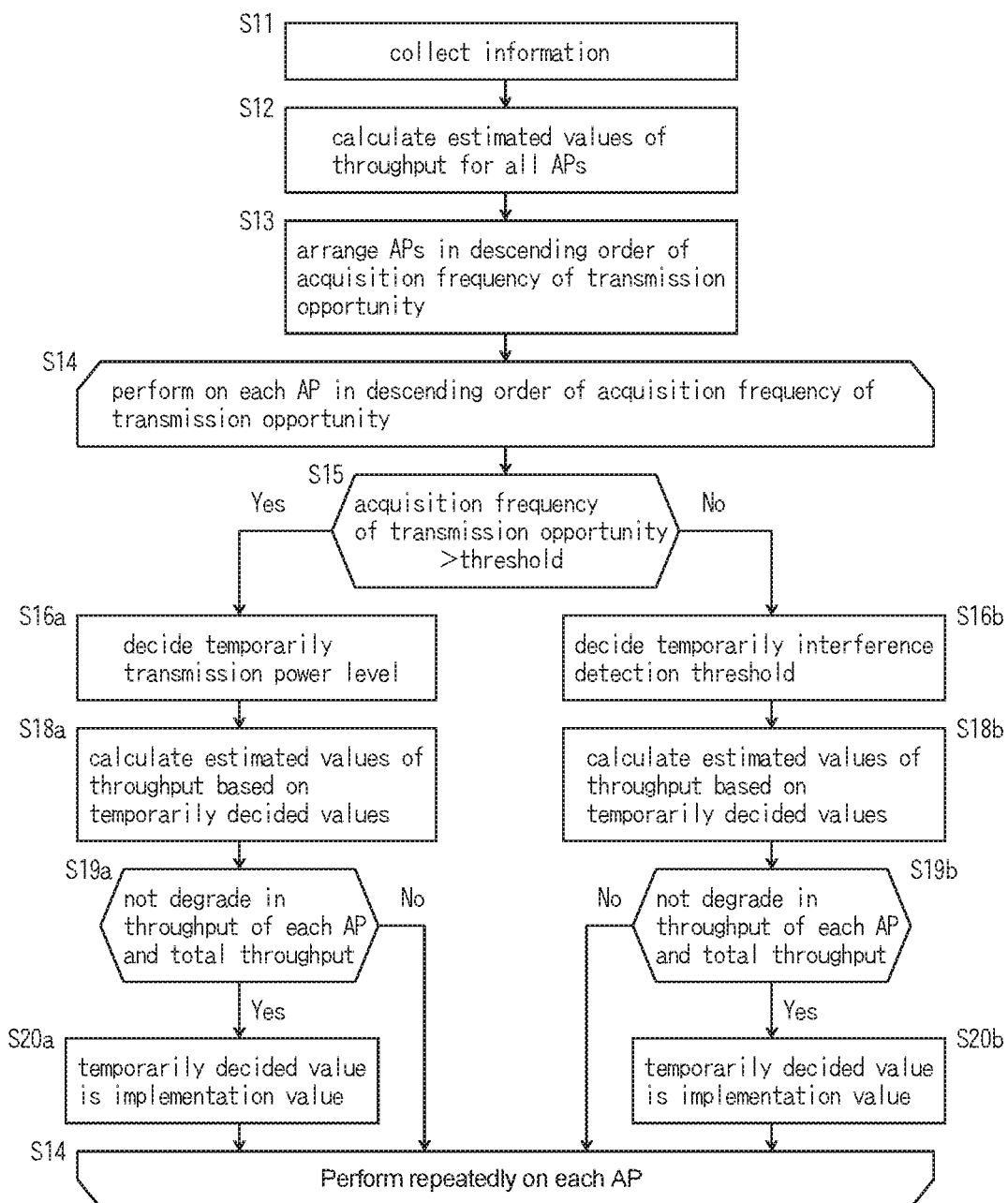
FIG. 3 is a flowchart illustrating a first example of a processing procedure for deciding a transmission power level and an interference detection threshold for each AP.
Figure 4:
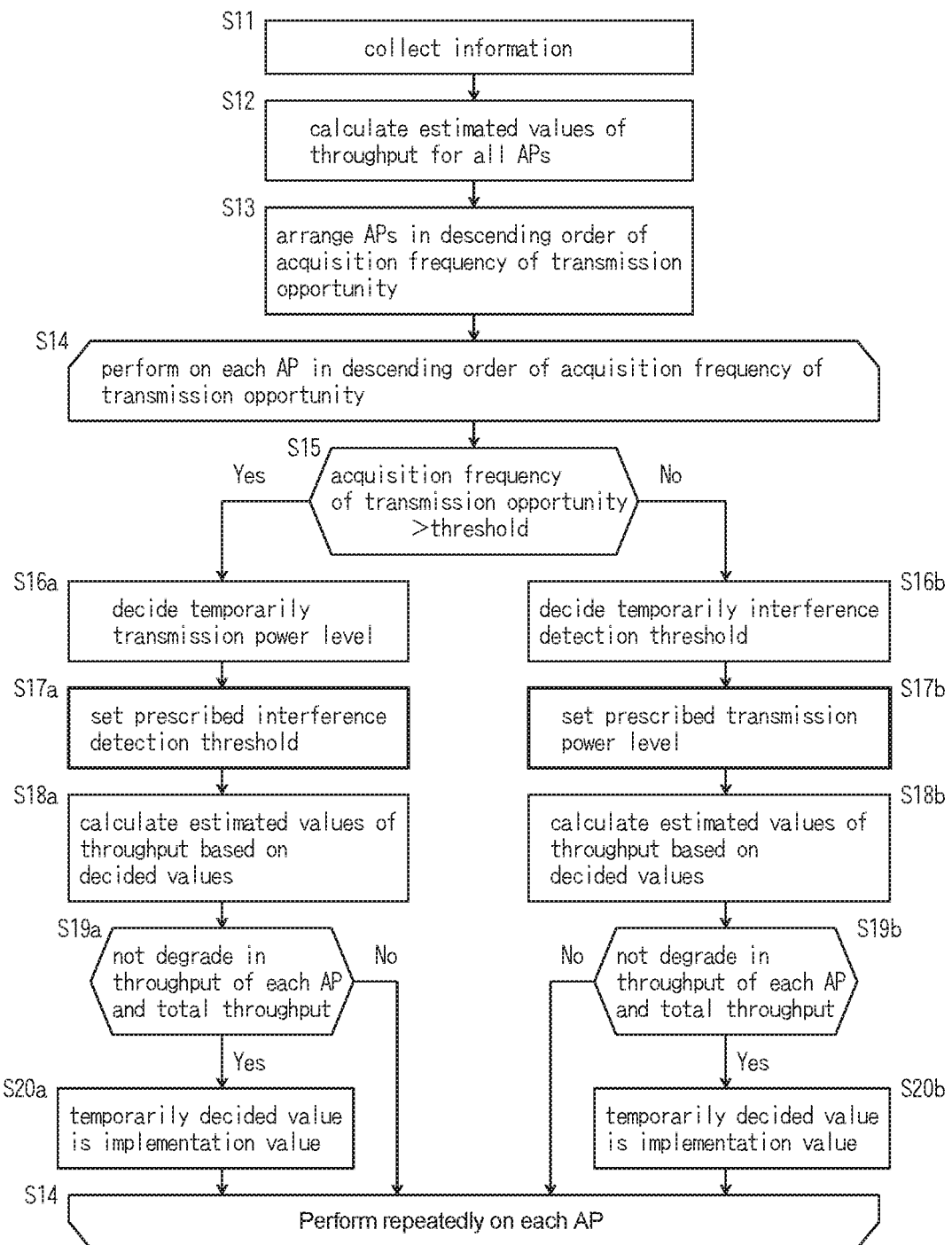
FIG. 4 is a flowchart illustrating a second example of the processing procedure for deciding the transmission power level and the interference detection threshold for each AP.

In FIGS. 3 and 4, the centralized management device first makes a connection and collects information from a control-target AP (S11). Next, acquisition frequency of transmission opportunity for each AP is calculated according to an interference relationship between each of the APs, an interference power level or the like of a neighboring wireless communication station, which is transmitted at the same time as a transmission opportunity is acquired, is considered, an optimal MCS is selected from a SINR or the like that is present when a wireless signal is transmitted to an STA that is a destination, and estimated values of throughput for all the APs are calculated (S12). Moreover, pieces of AP information are arranged in a line in descending order, that is, decreasing order, of the calculated acquisition frequency of transmission opportunity (S13). Next, the following processing for deciding a transmission power level and an interference detection threshold as control values is performed on each AP in descending order of the acquisition frequency of transmission opportunity (S14).

In a procedure for deciding the control value, it is first determined whether or not the acquisition frequency of transmission opportunity for the AP exceeds a threshold (S15). As a threshold that is used for the determination, a statistic value, such as an average value or a median value of the acquisition frequency of transmission opportunity, or a percentile value, may be used, and a threshold may be set from the number of APs from which it is determined that the number of APs, the acquisition frequency of transmission opportunity for which is high and the number of APs, the acquisition frequency of transmission opportunity for which is low are the same, and so forth.

For the AP, the acquisition frequency of transmission opportunity for which is determined as being above a threshold (Yes in S15), a transmission power level is temporarily decided in such a manner that the transmission power level for the AP is lowered and thus in such a manner that acquisition frequency of transmission opportunity for a neighboring AP is increased and an interference power level for the AP is decreased when concurrent transmission is performed (S16a). However, a minimum SINR necessary for a target MCS in communication between the AP and the STA that is a destination of the AP is calculated, and is set as a lower limit value of the transmission power level. A transmission power level that is at or below the lower limit value is not selected. Furthermore, as illustrated in FIG. 4, if the interference detection threshold is controlled in conjunction with the transmission power level, a prescribed interference detection threshold is also set at the same time (S17a). It is noted that in the case of IEEE 802.11ax, there is a limit on an OBSS PD level that is a CCA threshold which can be obtained according to the transmission power level, and that control of the transmission power level and the interference detection threshold is also assumed in the present invention. Furthermore, at this time, a maximum value or a minimum value that is determined according to laws and regulations, or specifications, is also considered and values that run counter to these are not selected.

Next, based on the transmission power level that is at the temporarily decided control values, or on the interference detection threshold that is in conjunction with the transmission power level, estimated values of throughput for all APs if the temporarily decided control value is applied are calculated (S18a). With a total value of calculated throughput values, a throughput value for each AP, or both of these, it is determined whether or not a degradation in the throughput value occurs in comparison with the pre-application case (S19a). If the degradation occurs, the temporarily decided value is not applied (No in S19a). Conversely, if the degradation in the throughput value does not occur, the temporarily decided value is recorded as an implementation value (S20a).

The above-described processing is repeatedly performed on each AP, the acquisition frequency of transmission opportunity for which exceeds the threshold as a result of the determination in Step S15, in descending order of the acquisition frequency of transmission opportunity.

On the other hand, for the AP, the acquisition frequency of transmission opportunity for which is below the threshold (No in S15), the interference detection threshold is increased, the interference detection threshold is temporarily decided in such a manner that the interference detection threshold is increased and thus in such a manner that the acquisition frequency of transmission opportunity is increased (S16b). Furthermore, as illustrated in FIG. 4, if the transmission power level is controlled in conjunction with the interference detection threshold, a prescribed transmission power level is also set (S17b). It is noted that in the case of IEEE 802.11ax, there is a limit on an OBSS PD level that is the CCA threshold which can be obtained according to the transmission power level, and that control of the transmission power level and the interference detection threshold is also ensured in the present invention. However, a maximum value or a minimum value that is determined according to laws and regulations, or specifications, is considered and values that run counter to these are not selected.

Next, based on the interference detection threshold that is at the temporarily decided control values, or on the transmission power level that is in conjunction with the interference detection threshold, estimated values of throughput for all APs if the temporarily decided control value is applied are calculated (S18b). With the total value of calculated throughput values, the throughput value for each AP, or both of these, it is determined whether or not the degradation in the throughput value occurs in comparison with the pre-application case (S19b). If the degradation occurs, the temporarily decided value is not applied (No in S19b). Conversely, if the degradation in the throughput value does not occur, the temporarily decided value is recorded as the implementation value (S20b).

The above-described processing is repeatedly performed on each remaining AP, the acquisition frequency of transmission opportunity for which is determined as being below the threshold in the determination in Step S15, in descending order of the acquisition frequency of transmission opportunity. Accordingly, for all APs, the transmission power level and the interference detection threshold are decided as the control values at which throughput is the best one, in descending order of the acquisition frequency of transmission opportunity.

Moreover, a processing procedure in Step S14 is repeated a plurality of times whenever needed. For example, in a process of selecting control values for all APs, the processing procedure may be repeated until it is determined that a change from a current control value is not made. Alternatively, the processing procedure may be repeated a limited number of times considering a computation time and the limited number of times may be set as an upper limit of the computation.

Figure 5:
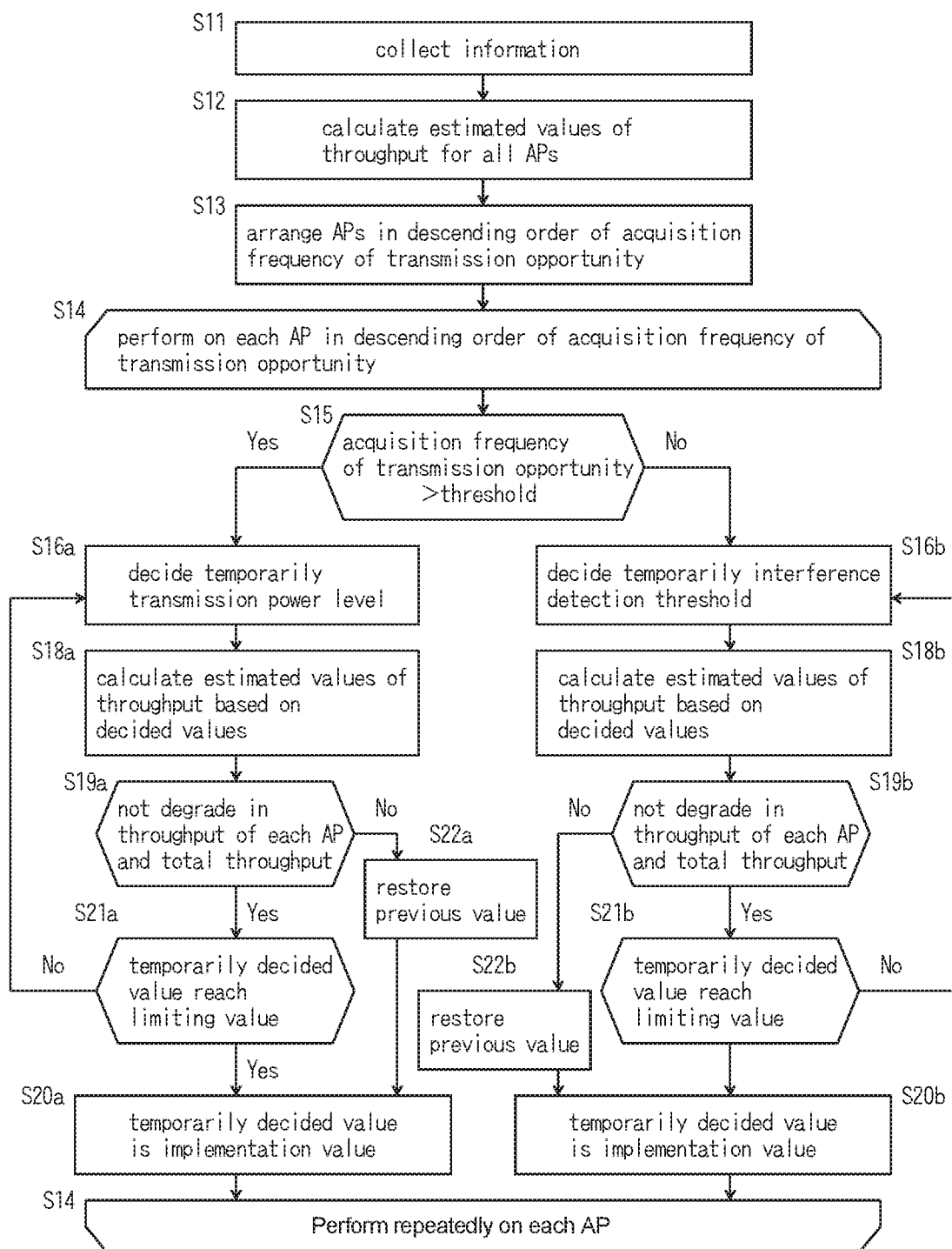
FIG. 5 is a flowchart illustrating a third example of the processing procedure for deciding the transmission power level and the interference detection threshold for each AP.
Figure 6:
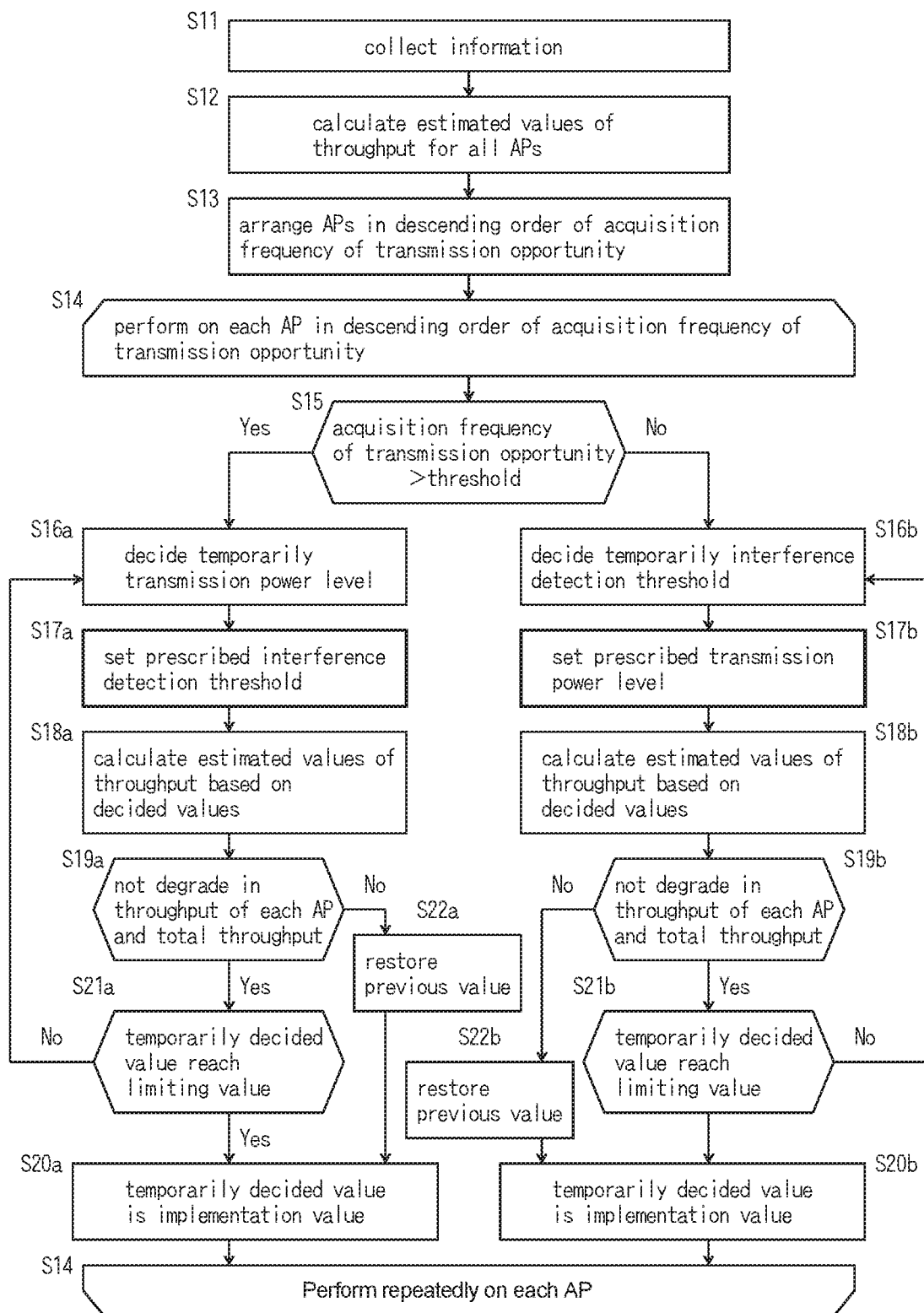
FIG. 6 is a flowchart illustrating a fourth example of the processing procedure for deciding the transmission power level and the interference detection threshold for each AP.

An example of a procedure in FIG. 5 is a modification to an example of the processing procedure in FIG. 3, and an example of a procedure in FIG. 6 is a modification to an example of the processing procedure in FIG. 4.

With processing operations in Steps S16a/b to S20a/b in FIGS. 3 and 4, the transmission power level and the interference detection threshold are temporarily decided, as the control values, for an AP, an acquisition frequency of transmission opportunity for which is arbitrary. If degradation in each of the estimated values of throughput for all APs that are calculated by applying the control values occurs, the temporarily decided value is not employed. If the degradation in each of the estimated values of throughput for all APs does not occur, the temporarily decided value is employed. This processing operations are performed starting from an AP, acquisition frequency of transmission opportunity for which is highest. However, the processing for the temporary decision of the control value for every AP is performed one time.

It is assumed that the examples of the processing procedures that are illustrated in FIGS. 5 and 6 have the feature that the processing for the temporary decision of the transmission power level and the interference detection threshold as the control values is repeated until a limiting value is reached and then proceeding to an AP, acquisition frequency of transmission opportunity for which comes next, takes place.

For APs, the acquisition frequencies of transmission opportunity for which are determined as being above the threshold in the determination in Step S15, estimated values of throughput for all the APs if the temporarily decided control value is applied are calculated based on the transmission power level that is at the temporarily decided control values, or on the interference detection threshold that is in conjunction with the transmission power level (S16a to S18a). With a total value of calculated throughput values, a throughput value for each AP, or both of these, it is determined whether or not a degradation in the throughput value occurs in comparison with the pre-application case (S19a). If a degradation in the throughput value does not occur, it is further determined whether or not the temporarily decided control value reaches the limiting value (S21a). If the limiting value is not reached, the transmission power level is lowered and the same processing is repeated (S16a to S19a). Then, if the temporarily decided control value reaches the limiting value, the temporarily decided value is recorded as the implementation value (S20a). Alternatively, if the transmission power level is lowered and the degradation in the throughput value occurs (No in S19a), returning to the immediately-preceding temporarily decided value takes place (S22a) and the immediately-preceding temporarily decided value is recorded as the implementation value (S20a).

Furthermore, for APs, the acquisition frequencies of transmission opportunity for which are determined as being lower in the determination in Step S15, estimated values of throughput for all the APs if the temporarily decided control value is applied are calculated based on the interference detection threshold that is at the temporarily decided control values, or on the transmission power level that is in conjunction with the interference detection threshold (S16b to S18b). With a total value of calculated throughput values, a throughput value for each AP, or both of these, it is determined whether or not a degradation in the throughput value occurs in comparison with the pre-application case (S19b). If a degradation in the throughput value does not occur, it is further determined whether or not the temporarily decided control value reaches the limiting value (S21b). If the limiting value is not reached, the interference detection threshold is raised and the same processing is repeated (S16b to S19b). Then, if the temporarily decided control value reaches the limiting value, the temporarily decided value is recorded as the implementation value (S20b). Alternatively, if the interference detection threshold is raised and the degradation in the throughput value occurs (No in S19b), returning to the immediately-preceding temporarily decided value takes place (S22b) and the immediately-preceding temporarily decided value is recorded as the implementation value (S20b).

In Step S16a in FIGS. 5 and 6, if control that lowers the transmission power level is performed when the temporarily decided value of the transmission power level does not reach the limiting value, a minimum transmission power level, at which a SINR that is a minimum requirement for a target MCS which is computed from the received power level of the STA that is a destination can be secured, may be set as the control value from the beginning. However, if the interference detection threshold and the transmission power level are controlled in conjunction with each other, that is, if the transmission power level is lowered and the interference detection threshold is raised, there is a likelihood that the acquisition frequency of transmission opportunity will also be increased due to a rise in the interference detection threshold, thereby causing a transmission opportunity for a neighboring AP to be prevented. When such a case is considered, control is effective that lowers a transmission power level in a stepwise manner while ensuring that a throughput for the target AP and all the APs is improved.

(First Method of Temporarily Deciding the Transmission Power Level)

A first method of lowering the transmission power level in a stepwise manner is a method of deciding the transmission power level from an interference detection power value for a neighboring AP.

(1) An AP is selected that performs control which lowers the transmission power level. In an example in FIG. 2, with reference to received power levels of a wireless signal of the AP 1, the AP 2, a received power level for which is observed as being above the interference detection threshold at a current point in time is selected from among the AP 1, the AP 2, and the AP 3. In the same manner, the AP 1 and the AP 3 are selected over the AP 2, and the AP 2 is selected over the AP 3.

(2) Among the selected APs, an AP in which a difference between each interference detection threshold and the received power level is minimized at a current point in time is decided, the difference between each interference detection threshold and the received power level for the AP is computed, and the computed difference is set to be the control value at which the transmission power level is lowered. In the example in FIG. 2, a difference between the interference detection threshold and the received power level in the AP 2 is minimized to −76−(−62)=14 dB, and the transmission power level for the AP 2 is lowered as much as that. It is noted that if at this time, there is a lower limit value of the transmission power level or a limit on the interference detection threshold that is controlled in conjunction, these, in combination, limits a value for lowering. Furthermore, a margin value may be provided when lowering the transmission power level, considering propagation channel performance. With this method, an effect of increasing the number of APs that are possibly transmitted at the same time as the AP can be expected.

(Second Method of Temporarily Deciding the Transmission Power Level)

A second method of lowering the transmission power level in a stepwise manner is a method of deciding the transmission power level from a SINR for a neighboring AP or the interference power level.

(1) An AP is selected that performs control which lowers the transmission power level. In the example in FIG. 2, with reference to the received power level of the wireless signals that are transmitted from the AP 1, an AP in which a SINR is poorest due to interference that is assigned by the wireless signal which is transmitted from the AP at a current point in time, or an AP in which the interference power level that is assigned is maximized is selected from among the AP 1, the AP 2, and the AP 3. However, a target for the AP that is selected in the above-described procedure is an AP, the received power level for which is at or below the interference detection threshold. In the example in FIG. 2, the target is the AP 3.

(2) To check whether or not the selected AP is at a SINR that satisfies a target MCS, the transmission power level is lowered until the transmission power level is equal to an interference power level from any other AP. With this method, an effect of improving communication quality of an AP that performs communication at the same time as the AP can be expected.

(Method of Temporarily Deciding the Interference Detection Threshold)

In Step S16b in each of FIGS. 5 and 6, when the temporarily decided value of the interference detection threshold does not reach the limiting value, a case where control is performed that raises the interference detection threshold is as follows. Because a proposition of the control is to increase the acquisition frequency of transmission opportunity, with reference to the received power level of the wireless signal that is transmitted from the neighboring AP, the received power level that is above a current interference detection threshold and is the closest is set to be the temporarily decided value. With this method, an effect of increasing a concurrent transmission opportunity for the AP can be expected.

Furthermore, if in Step S16a in each of FIGS. 5 and 6, the control is performed that lowers the transmission power level, or if in Step S16b in FIGS. 5 and 6, the control is performed that raises the interference detection threshold, a genetic algorithm may be employed, a random value may be selected within a range of values that take a probability P, while using the above-described temporary decision method at a probability (1−P), and the selected random value may be a temporarily decided value.

Figure 7:
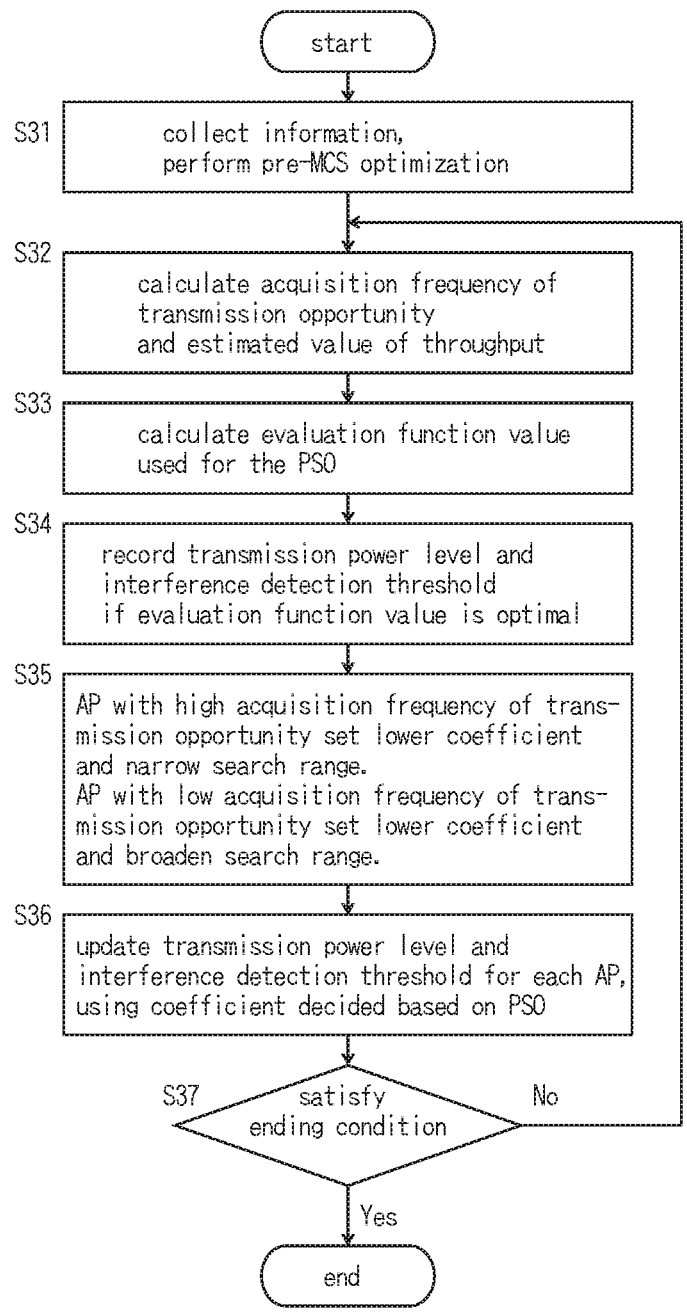
FIG. 7 is a flowchart illustrating an example of a processing procedure for calculating the transmission power level and the interference detection threshold using a Particle Swarm Optimization.

Furthermore, in deciding the transmission power level and the interference detection threshold, a Particle Swarm Optimization (PSO), which is a many-valued variable optimization method that aims at optimization while sharing pieces of information on an entire group on an individual basis, may be used as one method that has the randomness. In the case of application to the present invention, search performance can be improved by adjusting a parameter of the PSO based on the acquisition frequency of transmission opportunity. An example of the processing procedure is illustrated in FIG. 7. It is noted that the present processing takes the place of the processing procedure in each of FIGS. 3 to 6.

In FIG. 7, information collection and pre-MCS optimization are performed (S31), and calculation of the acquisition frequency of transmission opportunity and the estimated value of throughput is performed (S32). It is noted that these processing operations are the same as those in Steps S11, S12, and S18 in FIGS. 3 to 6. Next, for example, an evaluation function value that is used for the PSO is calculated from throughput or result of computation that is based on the throughput (S33), the transmission power level and the interference detection threshold if the evaluation function value is optimal are recorded (S34). Next, for an AP, the acquisition frequency of transmission opportunity for which is high, a coefficient of an amount of change in each of the transmission power level and the interference detection threshold is set to be a value that is lower than a reference value, thereby narrowing a search range, and for an AP, the acquisition frequency of transmission opportunity for which is low, the coefficient is set to be a value that is higher than the reference value, thereby broadening the search range (S35). Next, the transmission power level and the interference detection threshold for each AP are updated using a coefficient (weight) that is decided based on a PSO technique (S36). The above-described processing is repeated until an ending condition is satisfied (S37). As the ending condition, a case where improvements in the acquisition frequency of transmission opportunity and the throughput are almost converged, and the like are used.

Figure 8:
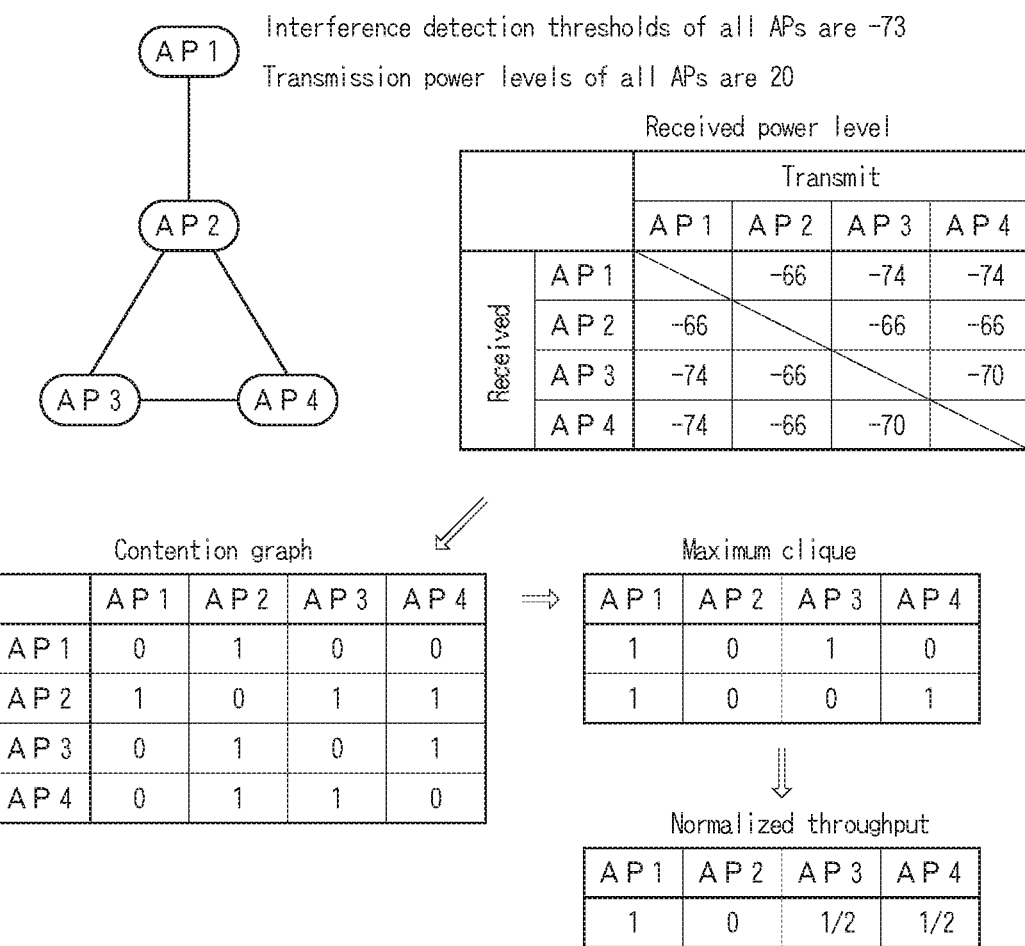
FIG. 8 is a diagram for describing a method of computing an estimated value of throughput.

In Step S18a/b in each of FIGS. 3 to 6, as a method of calculating the estimated value of throughput, a relationship among four APs that are illustrated in FIG. 8 is described. At this point, interference detection thresholds for all APs are set to −73 dBm, initial values of transmission power levels for all APs are set to 20 dBm, and a received power level of each destination terminal is set to −41 dBm.

Received power levels for the AP 1 to the AP 4 with respect to each other are as illustrated in FIG. 8. It is assumed that the AP 1 and the AP 2, the AP 2 and the AP 3, the AP 2 and the AP 4, and the AP 3 and the AP 4 detect an interference signal that is at or above the interference detection threshold, with respect to each other. With a contention graph, APs that are in a contention state are set to "1", and APs that are not in the contention state are set to "0". Maximum-sized cliques that are combinations in which the number of APs that possibly perform transmission at the same time is the greatest are the AP 1 and the AP3, and the AP 1 and the AP 4. Average values, each of which is normalized throughput, for the APs are $\{1, 0, \frac{1}{2}, \frac{1}{2}\}$. When this is multiplied by a transfer rate for each AP, approximate throughput therefor can be obtained.

Next, an example is described in which, for the AP 1, the AP 3, and the AP 4 that have high normalized throughput, a minimum value of a SINR necessary for a target MCS is lowered up to a transmission power level that can be secured. The interference detection threshold that the AP 1, the AP 3, and the AP 4 possibly set while accomplishing the SINR is $(-41-x)-(-73+x)=20x=6$ as a finite differential x from a current interference detection threshold. Therefore, as indicated by a symbol * in FIG. 9, the interference detection threshold for each of the AP 1, the AP 3, and the AP 4 is raised from −73 to −67, and the transmission power level therefor is lowered from 20 to 14.

Figure 9:
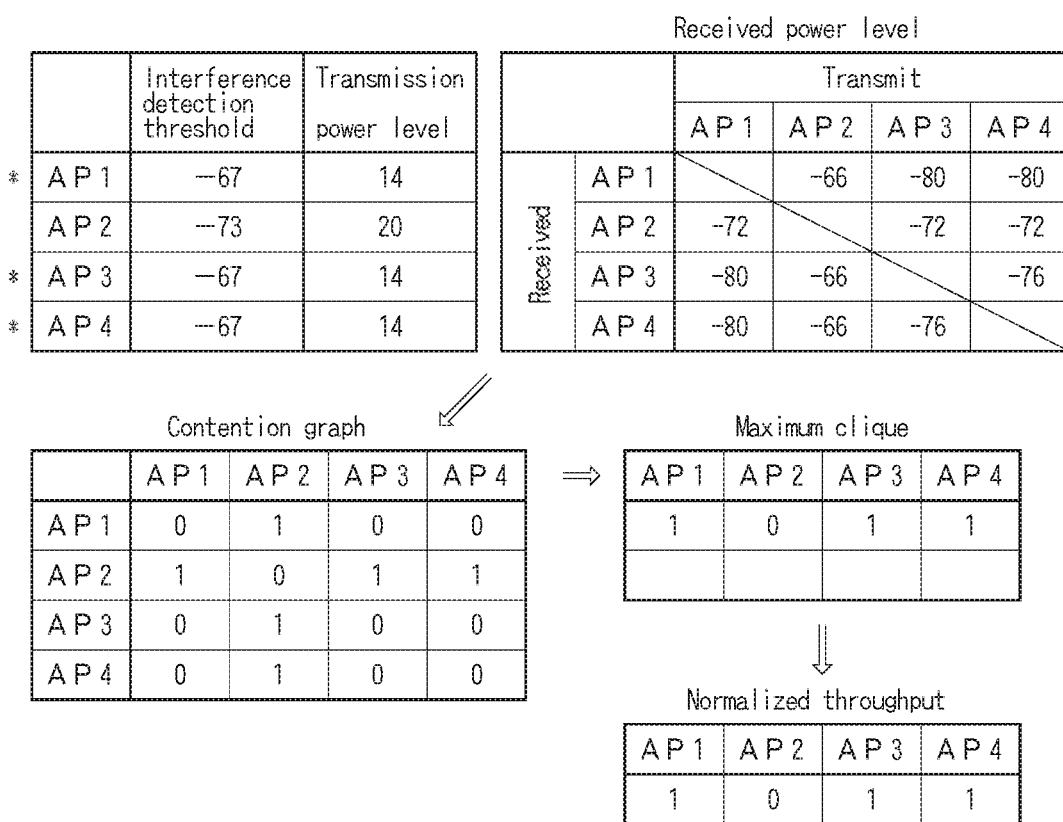
FIG. 9 is a diagram for describing an example of control to an AP, normalized throughput for which is high.

The received power levels for the AP 1 to the AP 4 with respect to each other, which are based on this, are as illustrated in FIG. 9. A received power level of −76 between the AP 3 and the AP 4 is below the interference detection threshold. The AP 1 and the AP 2, the AP 2 and the AP 3, and the AP 2 and the AP 4 detect the interference signal that is at or above the interference detection threshold, with respect to each other. A corresponding contention graph is updated. Because the AP 3 and the AP 4 do not detect a signal with respect to each other, a maximum-sized clique that possibly performs transmission at the same time is a combination of the AP 1, the AP 3, and the AP 4, and the maximum-sized clique and the normalized throughput are $\{1, 0, 1, 1\}$ and the throughput is improved.

Next, for the AP 2 that has low normalized throughput, the interference detection threshold is raised in such a manner that a minimum RSSI is exceeded. Because the AP 1, the AP 3, and the AP 4 are the farthest distance from the AP 2, the interference detection threshold and the transmission power level are decided based on −67.2 dBm that is a total value of −72 dBm×3 frames, as a total value of the RSSI. Therefore, as indicated by the symbol * in FIG. 10, the interference detection threshold for the AP 2 is raised from −73 to −67, and the transmission power level therefor is lowered from 20 to 14.

Figure 10:
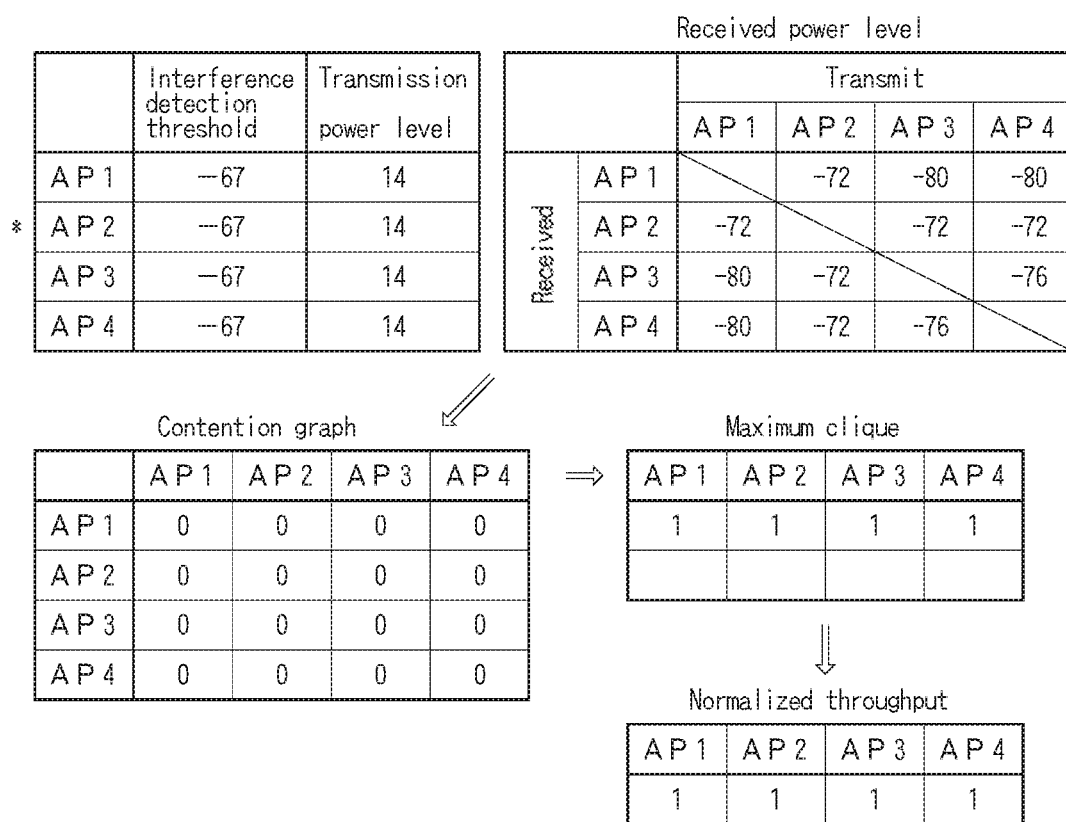
FIG. 10 is a diagram illustrating an example of control to an AP, the normalized throughput for which is low.

The received power levels for the AP 1 to the AP 4 with respect to each other, which are based on this, are as illustrated in FIG. 10. A received power level for a combination of all APs is below the interference detection threshold. A corresponding contention graph is updated. The maximum-sized clique and the normalized throughput are $\{1, 1, 1, 1\}$, and the throughput is maximized.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. A wireless communication system comprising:
a plurality of access points interfering with each other;
a plurality of stations being connected to the access points; and
a centralized management device being connected to the access points, wherein:
the centralized management device is configured to include
an information collection unit that collects interference power level information including received power levels from neighboring access points being a source that causes interference to the access points, a received power level from each station being a destination of the access points, and transmission power level information including a transmission power level of the access points, and
a control value decision unit that decides an interference detection threshold and a transmission power level in the access points according to an acquisition frequency of transmission opportunity and an estimated value of throughput that are computed, from the collected information, based on an interference relationship, and that notifies the decided interference detection threshold and the decided transmission power level as control values to the access points; and
the access points are configured to perform control of the interference detection threshold and the transmission power level based on the control values notified from the centralized management device.

2. The wireless communication system according to claim 1, wherein
the access points are configured to notify the interference detection threshold and the transmission power level notified from the centralized management device to the each station under the control, and the each station is configured to perform control based on the notified interference detection threshold and the notified transmission power level.

3. The wireless communication system according to claim 1, wherein
the control value decision unit is configured to temporarily decide the interference detection threshold and the transmission power level and to compute an estimated value of throughput after the control using a temporarily decided value, and if throughput improves, to set the temporarily decided value as the control value.

4. The wireless communication system according to claim 1, wherein
the control value decision unit is configured to decide the interference detection threshold and the transmission power level in order from an access point having higher acquisition frequency of transmission opportunity.

5. The wireless communication system according to claim 1, wherein
among control-target access points, the control value decision unit is configured to perform control that lowers the transmission power level on an access point having the acquisition frequency of transmission opportunity higher than a predetermined threshold, and to perform control that raises the interference detection threshold on an access point having the acquisition frequency of transmission opportunity lower than the predetermined threshold.

6. The wireless communication system according to claim 5, wherein
the control value decision unit is configured to set a lower limit value of the transmission power level based on a SINR value that is at least necessary in a target modulation and demodulation scheme by using the received power level from the each station being the destination, which is collected by the information collection unit.

7. The wireless communication system according to claim 5, wherein
when lowering the transmission power level of the access point, the control value decision unit is configured to set as a reference a received power level from an access point which is higher than the interference detection threshold, among the received power levels observed by the access point.

8. The wireless communication system according to claim 5, wherein
when lowering the transmission power level of the access point, the control value decision unit is configured to set as a reference a received power level from an access point having one of
an interference power level equal to or above a predetermined value, the interference power level is caused by a wireless signal transmitted from the access point, and
a SINR equal to or below a predetermined value.

9. The wireless communication system according to claim 5, wherein
when raising the interference detection threshold of the access point, the control value decision unit is configured to set as a reference a received power level that is above and the closest to a current interference detection threshold, among the received power levels observed by the access point.

10. The wireless communication system according to claim 1, wherein
when searching the interference detection threshold and the transmission power level using a Particle Swarm Optimization (PSO) method, the control value decision unit is configured to set a value lower than a reference value to a coefficient of an amount of change in the interference detection threshold and the transmission power level for an access point having the acquisition frequency of transmission opportunity higher than a predetermined threshold, and to set a value higher than a reference value to a coefficient of an amount of change in the interference detection threshold and the transmission power level for an access point having the acquisition frequency of transmission opportunity lower that the predetermined threshold.

11. A wireless communication method of a system that includes a plurality of access points interfering with each other, a plurality of stations being connected to the access points, and a centralized management device being connected to the access points, in which the centralized management device controls a transmission power level and an interference detection threshold for the access points, wherein:

the centralized management device
- collects interference power level information including received power levels from neighboring access points being a source that causes interference to the access points, a received power level from each station being a destination of the access points, and transmission power level information including a transmission power level of the access points, and
- decides an interference detection threshold and a transmission power level in the access points according to an acquisition frequency of transmission opportunity and an estimated value of throughput that are computed, from the collected information, based on an interference relationship, and notifies the decided interference detection threshold and the decided transmission power level as control values to the access points; and the access points perform control of the interference detection threshold and the transmission power level based on the control values notified from the centralized management device.

* * * * *